United States Patent
Yuasa

(10) Patent No.: US 9,405,966 B2
(45) Date of Patent: *Aug. 2, 2016

(54) TRAFFIC CONTROL APPARATUS, METHOD THEREOF, AND PROGRAM THEREFOR

(71) Applicant: KABUSHIKI KAISHA TOSHIBA, Minato-ku, Tokyo (JP)

(72) Inventor: Mayumi Yuasa, Tokyo (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/669,113

(22) Filed: Mar. 26, 2015

(65) Prior Publication Data

US 2015/0205999 A1      Jul. 23, 2015

Related U.S. Application Data

(63) Continuation of application No. 14/169,246, filed on Jan. 31, 2014, now Pat. No. 9,036,875.

(30) Foreign Application Priority Data

Feb. 6, 2013   (JP) .................................. 2013-21398

(51) Int. Cl.
    *G06K 9/00*      (2006.01)
    *G06K 9/32*      (2006.01)

(52) U.S. Cl.
    CPC ........ *G06K 9/00288* (2013.01); *G06K 9/00255* (2013.01); *G06K 9/00912* (2013.01); *G06K 9/32* (2013.01)

(58) Field of Classification Search
    CPC .......... G06K 9/00288; G06K 9/00892; G06K 9/0061; G06K 21/32
    See application file for complete search history.

(56) References Cited

U.S. PATENT DOCUMENTS

2009/0207251 A1 *   8/2009   Kobayashi ......... G06K 9/00912
                                                              348/156

FOREIGN PATENT DOCUMENTS

| JP | 2000-259834 | 9/2000 |
| JP | 2003-141541 | 5/2003 |
| JP | 2004-118627 | 4/2004 |

* cited by examiner

*Primary Examiner* — Edward Park
(74) *Attorney, Agent, or Firm* — Amin, Turocy & Watson LLP

(57) ABSTRACT

There is provided a traffic control apparatus including: an image input unit configured to input an image including a face of a user; a face detecting unit configured to detect a face area of the user from the image; a generating unit configured to obtain a difference between a state of the detected face area and a state of a optimal face area, and generate presentation information for instructing the user to move his or her face to a position suitable for the face recognition when the difference is large; and a noticing unit having a plurality of keys arranged in a matrix pattern, and configured to illuminate, blink, or extinguish one or the plurality of keys for specifying the position that the face is to be moved to on the basis of the presentation information.

11 Claims, 12 Drawing Sheets

OPTIMAL FACE AREA

FACE IMAGE

DETECTED FACE AREA

FACE IS TOO FAR ON LEFT SIDE

INSTRUCT TO MOVE FACE RIGHTWARD (R BLINKS)

FACE IS TOO SMALL

INSTRUCT TO MOVE FACE FORWARD (F BLINKS)

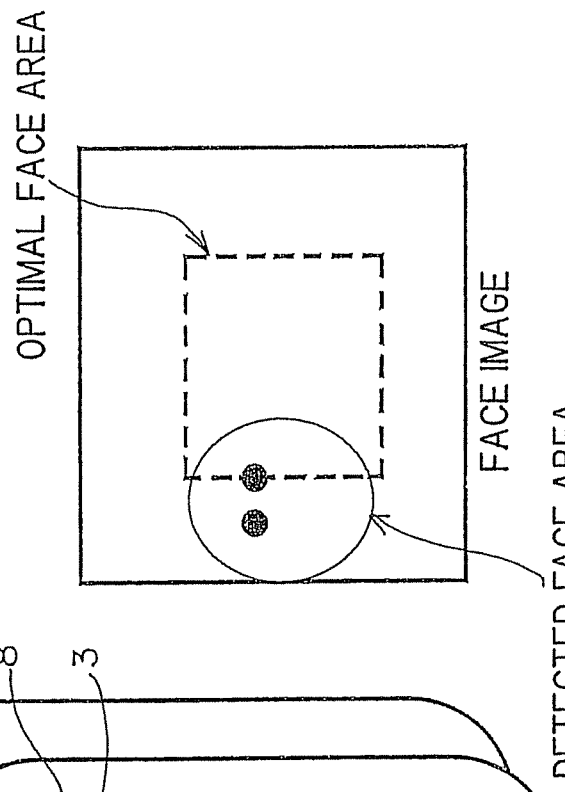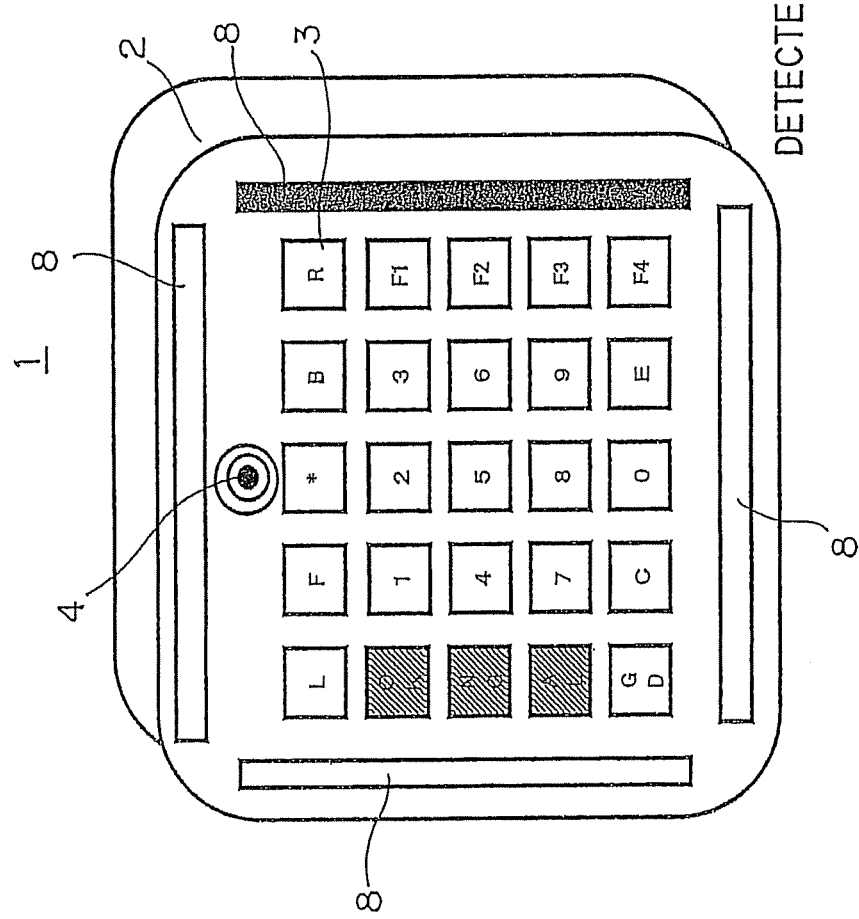

FACE IS TOO FAR ORIENTED LEFTWARD

TRAFFIC CONTROL APPARATUS, METHOD THEREOF, AND PROGRAM THEREFOR

CROSS-REFERENCE TO RELATED APPLICATIONS

This application is a Continuation of application Ser. No. 14/169,246 filed Jan. 31, 2014, the entire contents of which are incorporated herein by reference.

This application is based upon and claims the benefit of priority from the prior Japanese Patent Application No. 2013-21398, filed on Feb. 6, 2013; the entire contents of which are incorporated herein by reference.

FIELD

Embodiments described herein relate generally to a traffic control apparatus by using face recognition, a method thereof, and a program therefor.

BACKGROUND

A traffic control apparatus configured to control whether or not to grant a permission of traffic by face recognition takes an image of the face of a user by a camera, and performs face recognition by detection of a face area from the image.

In order to enhance the face recognition, there is provided a traffic control apparatus configured to display information that gives instructions to a user which position the face of the user should be in and which posture the user should take to ensure identification of the face of the user on a display.

However, in the traffic control apparatus described above, the user cannot know how his or her face is being shot unless there is a display. Therefore, there is a problem that face identification is difficult if the shot image of the user's face is out of alignment from the center of the image, or the face in the image is too small.

Therefore, it is an object of the embodiments to provide a traffic control apparatus configured to prompt a user to put his or her face in a state suitable for face recognition, a method thereof, and a program therefor.

BRIEF DESCRIPTION OF THE DRAWINGS

FIG. 13A is a drawing illustrating a light-emitting pattern of keys on the noticing unit according to a third modification;

FIG. 13B is a drawing illustrating a face image;

DETAILED DESCRIPTION

Figure 1:
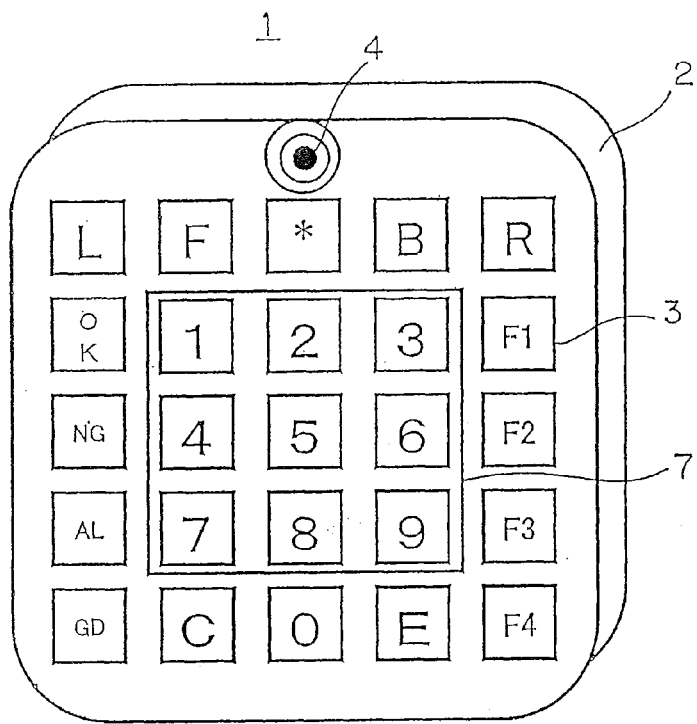
FIG. 1 is an appearance view of a traffic control apparatus according to Embodiment 1.

According to embodiments, there is provided a traffic control apparatus including: an image input unit configured to input an image including a face of a user taken by a camera; a face detecting unit configured to detect a face area of the user from the image; a generating unit configured to obtain a difference between a state of the detected face area and a state of a face area suitable for face recognition, and generate presentation information for instructing the user to move the face to a position and an orientation suitable for the face recognition when the difference is larger than a threshold value; and a noticing unit having a plurality of keys arranged in a matrix pattern, and configured to illuminate, blink, or extinguish one or the plurality of keys for specifying the position or the direction that the face is to be moved to on the basis of the presentation information.

Referring now to the drawings, a traffic control apparatus 1 of an embodiment will be described below.

Embodiment 1

Referring now to FIG. 1 to FIG. 5, the traffic control apparatus 1 according to Embodiment 1 will be described.

An appearance and a state of installation of the traffic control apparatus 1 will be described with reference to FIG. 1. FIG. 1 is an appearance drawing of the traffic control apparatus 1, and FIG. 2 is a drawing illustrating the state of illustration of the traffic control apparatus 1.

As illustrated in FIG. 1, the traffic control apparatus 1 includes a plurality of keys 3 arranged on a front surface of an apparatus body 2 in a matrix pattern, for example, in a lattice pattern of 5 rows×5 columns, and a single camera 4 installed at an upper center of the apparatus body 2. The keys 3 include ten-key ("0", "1" to "9"), function keys ("F1" to "F4"), and other keys ("L", "F", "*", "B", "R", "OK", "NG", "AL", "GD", "C", "E") arranged in a lattice pattern of 5 rows×5 columns, the respective keys 3 have translucency, and light-emitting elements such as LED lamps are provided therein.

Figure 2:
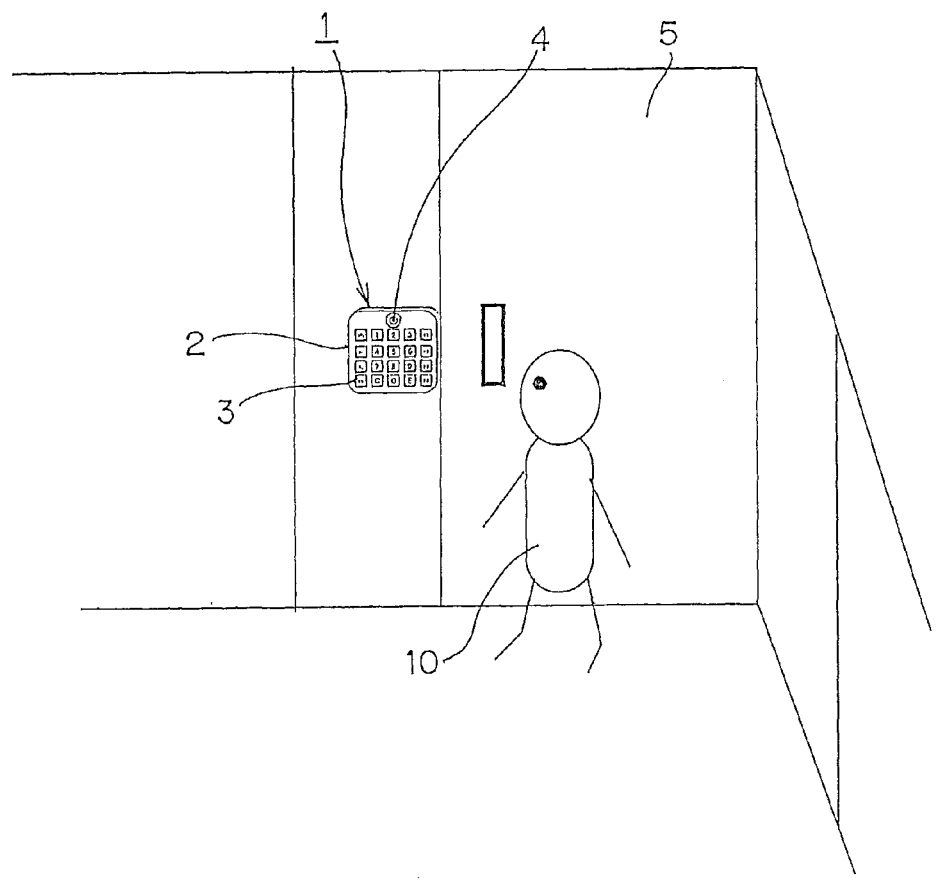
FIG. 2 is a drawing illustrating a state of installation of the traffic control apparatus.

As illustrated in FIG. 2, the traffic control apparatus 1 is provided on the side of a door 5 of a room at a height of the face of a user 10. Then, the user 10 stands in front of the apparatus body 2 of the traffic control apparatus 1, and the traffic control apparatus 1 takes an image (ie. face image) of the user 10 by the camera 4. Subsequently, the traffic control apparatus 1 unlocks the door 5 when the feature obtained from the image matches the stored in advance registered feature of the person who is authorized to pass through after comparison.

Figure 3:
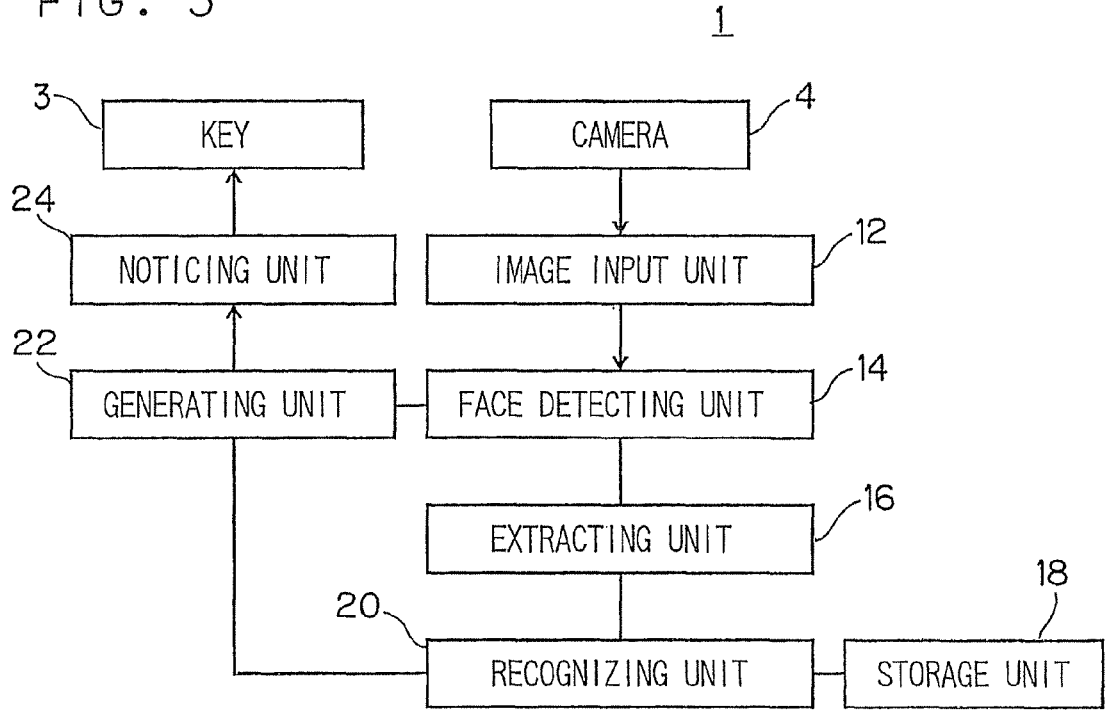
FIG. 3 is a block diagram of the traffic control apparatus.

A configuration of the traffic control apparatus 1 will be described with reference to FIG. 3. FIG. 3 is a block diagram illustrating the traffic control apparatus 1.

As illustrated in FIG. 3, the traffic control apparatus 1 includes an image input unit 12, a face detecting unit 14, an extracting unit 16, a storage unit 18, a recognizing unit 20, a generating unit 22, and a noticing unit 24.

The image input unit 12 inputs a face image of the user 10 from the camera 4 as an object of face recognition.

The face detecting unit 14 detects a face area from the input face image.

The extracting unit 16 extracts the feature of the face of the user 10 from the detected face area. The extracting unit 16 extracts the feature of persons allowed to pass through the door 5 by using the image input unit 12 and the face detecting unit 14 as registered amounts of characteristics.

The storage unit 18 stores the features of the persons allowed to pass through the door 5 obtained as described above as the registered features.

The recognizing unit 20 recognizes the face of the user 10 by matching a feature of the user 10 extracted by the extracting unit 16 and the registered feature stored in the storage unit 18.

The generating unit 22 generates presentation information for giving an instruction to the user 10 to move his or her face to a state of the face area suitable for the face recognition (the position and the size of the face area).

The noticing unit 24 includes the keys 3 respectively having a light-emitting element, and a control circuit configured to cause the light-emitting elements of the respective keys 3 to emit light, and illuminates or blinks the keys 3 arranged in a lattice manner on the basis of the presentation information generated by the generating unit 22.

Figure 8:
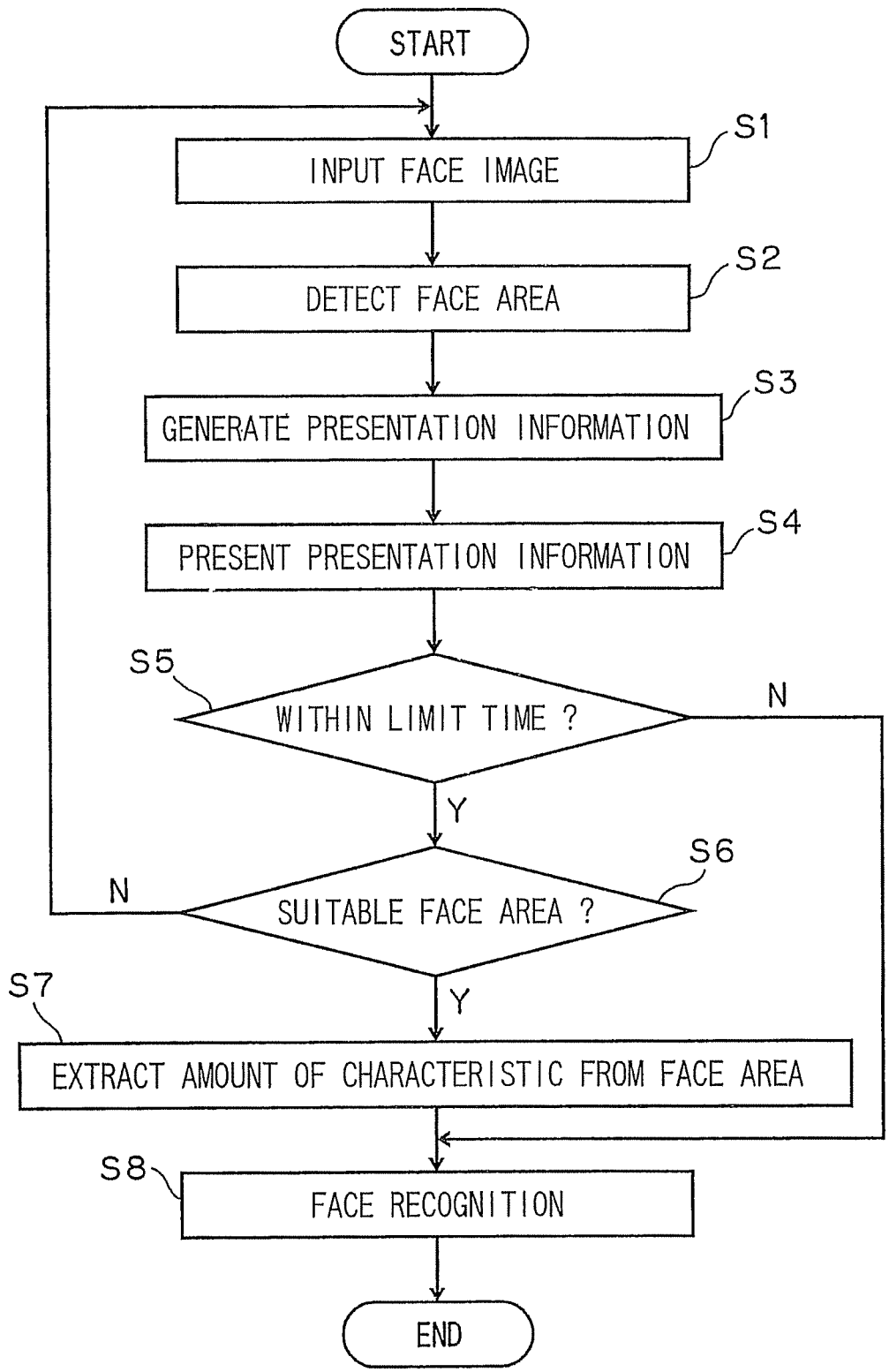
FIG. 8 is a flowchart of the traffic control apparatus.

Subsequently, an operation of the traffic control apparatus 1 at the time of face recognition will be described with reference to a flowchart in FIG. 8.

First of all, in Step S1, when the user 10 stands in front of the apparatus body 2 of the traffic control apparatus 1 and, for example, presses the key 3 of "*", the image input unit 12 inputs a face image in which the user 10 appears from the camera 4. Then, the procedure goes to Step S2.

Then, in Step S2, the face detecting unit 14 detects the face area from the input face image. For example, the following method is used for the detection of the face area.

First of all, in order to identify whether the face of the user 10 is in an area of concern of the face image, the face detecting unit 14 sets a plurality of sets of pixel areas in the area of concern.

Secondly, the face detecting unit 14 calculates a differential value (Harr-Like feature) of brightness of the respective pixel area sets.

Thirdly, the face detecting unit 14 identifies whether or not the face is in the area of concern by comparing the differential value and a threshold value predetermined by preparatory learning by using the face image of the user 10. The face detecting unit 14 is capable of determining whether or not the area of concern is the face area with higher degree of accuracy by combining a plurality of threshold processes of brightness differential values (Joint Harr-Like feature) for evaluating the correlation (co-occurrence property) between the plurality of features.

Fourthly, the face detecting unit 14 detects the position and the size of the face area by determining the area of concern while changing the position and the size of the area of concern in the face image. Then, the procedure goes to Step S3.

Subsequently, in Step S3, the generating unit 22 calculates differences between the position and the size of the current face area on the face image detected by the face detecting unit 14 and the position and the size of the face area on the face image suitable for the face recognition (hereinafter, referred to as "the optimal face area").

The term the "position of the current face area" means a coordinate value (x1, y1) of the position of the center of the detected face area on the face image or a coordinate value (x1, y1) of a position of center of gravity, and the term "the size of the current face area" means a size L1 of the detected face area. The term "coordinate values" mean coordinate values in an x-y orthogonal coordinate system which specifies the pixel position of a certain point on the face image. The term the "size of the face area" means the size in the vertical direction (y-direction) or the size in the lateral direction (x-direction) of the face area.

The term the "position of the optimal face area" means, for example, a coordinate value (x0, y0) of the center position on the face image, and the term the "size of the face area" means a size L0 at the center position on the face image in the predetermined vertical direction or lateral direction optimal to the face recognition.

The term "difference in position of the face area" means a difference $D(x0-x1, y0-y1)=D(xd, yd)$ between the coordinate value (x1, y1) of the center position or the position of center of gravity of the position of the current face area and the coordinate value (x0, y0) of the center portion of the optimal face area.

The term the "difference in size of the face areas" means a difference Ld between the size of the current face area and the size of the optimal face area, where $Ld=L0-L1$.

The generating unit 22 generates first presentation information indicating the position of the current face area (x1, y1) and the size L1. The "first presentation information" illuminates one or the plurality of keys 3 included in a range corresponding to the position of the face (x1, y1) and the size L1 for giving an instruction to the user 10 by using light-emitting patterns of the plurality of keys 3 arranged in the lattice pattern.

Subsequently, the generating unit 22 generates second presentation information for giving an instruction to move to the state suitable for the face recognition when the difference of the position of the face area D (xd, yd) exceeds the predetermined threshold values (for example, threshold values determined respectively in the x-direction and the y-direction). As a method of generating, the generating unit obtains the positions and the range of the keys 3 corresponding to the positions and the range indicated by a vector (=difference D) to the center position (x0, y0) on the face image from the center position (x1, y1) of the current face area of the user 10 and generates a light-emitting pattern for causing the positions or the range of the keys 3 to blink as the second presentation information.

The generating unit 22 generates the second presentation information for giving an instruction to be a size suitable for the face recognition even when the difference Ld in size of the face area exceeds a predetermined threshold value. As a method of generating, when a relationship; the difference Ld in size of the face area>threshold value Lmin is satisfied, a light-emitting pattern for causing the key 3 at the center of the plurality of keys 3 arranged in the lattice pattern of 5 rows×5 columns to blink is generated as the second presentation information.

Examples of the presentation information will be illustrated in FIG. 4 to FIG. 7. FIG. 4A, FIG. 5, FIG. 6A, and FIG. 7 illustrate a light-emitting pattern of the keys 3 of the traffic control apparatus 1. Hatched portions of the keys 3 indicate the illuminated keys 3, and portions where star mark is provided indicate the blinking keys 3. FIG. 4B and FIG. 6B illustrate face images.

Figure 4A:
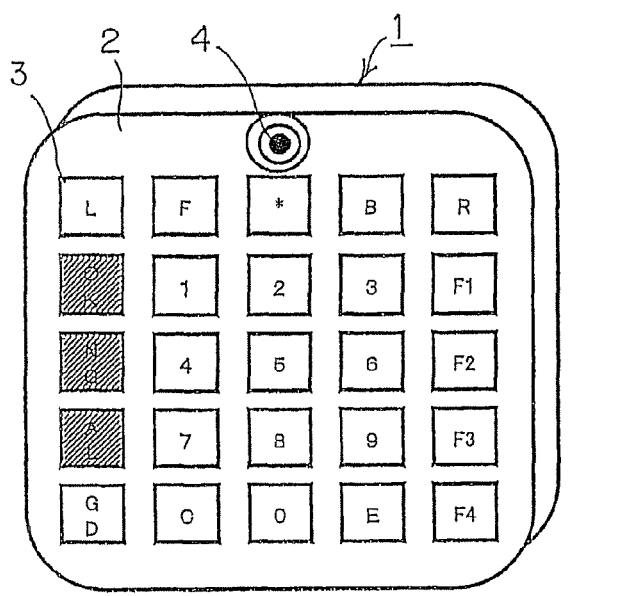
FIG. 4A is a drawing illustrating a first light-emitting pattern of keys on a noticing unit.
Figure 4B:
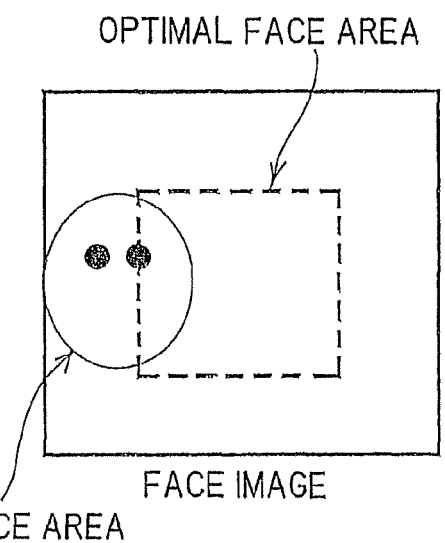
FIG. 4B is a drawing illustrating a face image.
Figure 5:
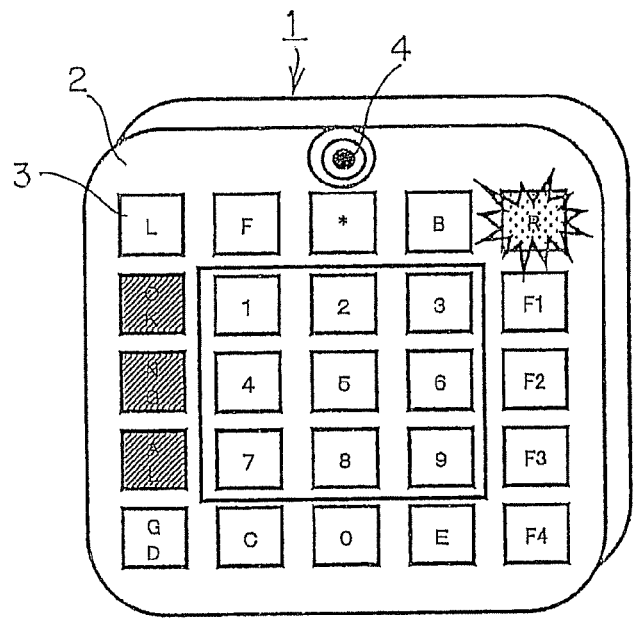
FIG. 5 is a drawing illustrating a second light-emitting pattern of the keys on the noticing unit.

Referring to FIG. 4 and FIG. 5, a case where an instruction is given to the user 10 to move his or her face rightward because the position of the face is too far on the left side will be described. Since the current face area on the face image is too far on the left side with respect to the optimal face area illustrated in FIG. 4B, the generating unit 22 generates a light-emitting pattern for illuminating the left side range (the keys 3 of "OK", "NG", "AL") of the plurality of keys 3 arranged in the lattice pattern as illustrated in FIG. 4A as the first presentation information indicating the position and the size of the current face area. With this first presentation information, the user 10 knows that his or her face is too far on the left side only by looking at the light-emitting pattern of the plurality of keys 3 arranged in the lattice pattern of 5 rows×5 columns without viewing the display. Subsequently, the generating unit 22 generates the second presentation information as the light-emitting pattern for blinking the key 3 of "R" as illustrated in FIG. 5 for giving an instruction to the user 10 to move his or her face rightward. With the first presentation information and the second presentation information, the user 10 knows that he or she is instructed to move his or her face rightward only by looking at the light-emitting pattern of the plurality of keys 3 arranged in the lattice pattern of 5 rows×5 columns without viewing the display.

Figure 6A:
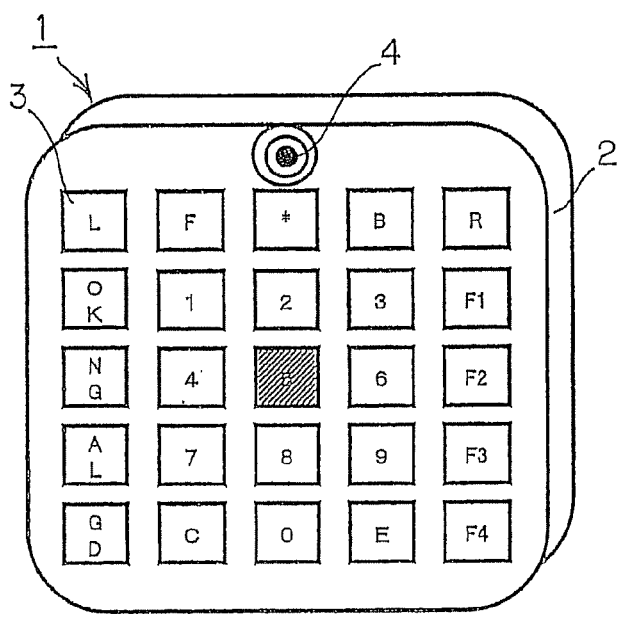
FIG. 6A is a drawing illustrating a third light-emitting pattern of keys on the noticing unit.
Figure 6B:
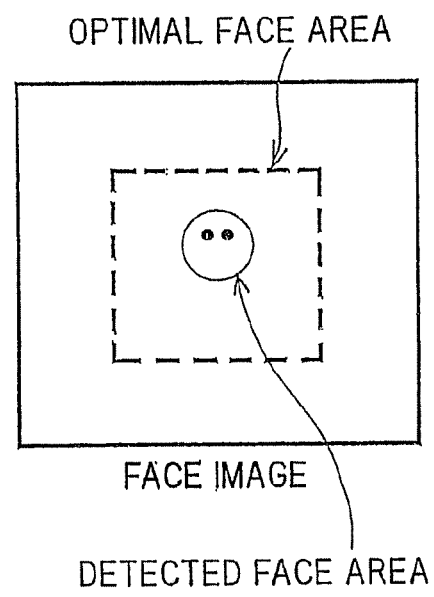
FIG. 6B is a drawing illustrating a face image.
Figure 7:
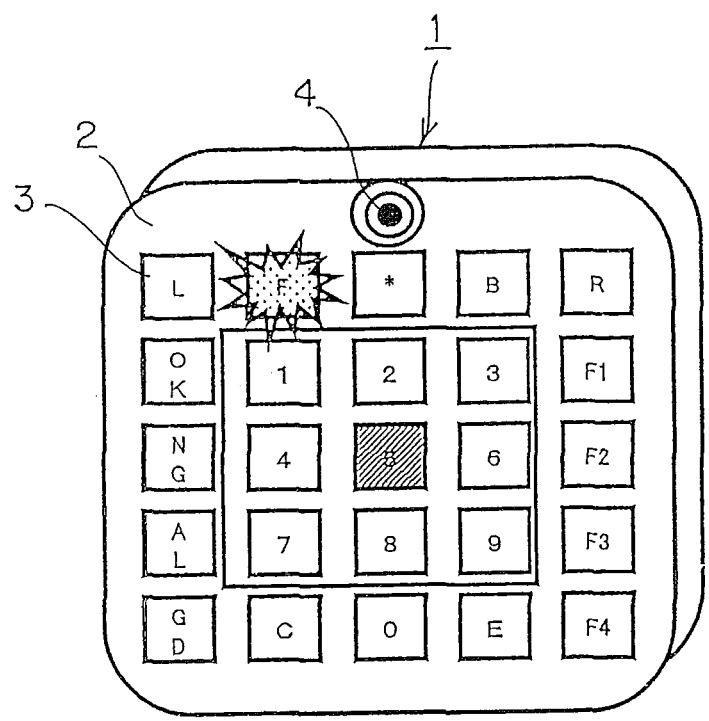
FIG. 7 is a drawing illustrating a fourth light-emitting pattern of the keys on the noticing unit.

Referring now to FIG. 6 and FIG. 7, a case where the face of the user 10 in the face image is too small will be described. As illustrated in FIG. 6B, since the current face area is too small in the face image, the generating unit 22 generates the second presentation information as a light-emitting pattern for illuminating only the center portion (the key 3 of "5") of the plurality of keys 3 arranged in the lattice pattern as illustrated in FIG. 6A, and then the generating unit 22 generates the second presentation information as a light-emitting pattern for blinking the element of "F" in order to instruct the user 10 to perform an action to move forward (an action to approach the apparatus body 2) as illustrated in FIG. 7.

Then, the procedure goes to Step S4.

Subsequently, in Step S4, the noticing unit 24 operates a control circuit of the light-emitting element on the basis of the first presentation information and the second presentation information generated by the generating unit 22, and illuminates or blinks the light-emitting elements of the plurality of keys 3 arranged in a lattice pattern to present the first presentation information and the second presentation information to the user 10. Accordingly, the user 10 is capable of moving to a position where his or her face is readily recognized only by looking at the light-emitting pattern of the plurality of keys 3 arranged in the lattice pattern of 5 rows×5 columns without viewing the display. Then, the procedure goes to Step S5.

Subsequently, in Steps S5 and S6, the traffic control apparatus 1 repeats the processes in Steps S2 to S4 until it is determined that the face area detected from the face image is in a state of being suitable for the face recognition, or until a predetermined limit time is exceeded.

In other words, in Step S5, the traffic control apparatus 1 determines whether or not it is within the limit time and, if yes, the procedure goes to Step S6, and the procedure terminates if the limit time is exceeded. If the state of the face suitable for the face recognition is not achieved even though the user 10 has moved his or her face within the limit time, the traffic control apparatus 1 may notify the user 10 of that effect by illuminating or blinking all the keys 3.

In Step S6, the traffic control apparatus 1 goes to Step S7 if it is determined that the face area detected within the limit time is in a state suitable for the face recognition, and goes back to Step S1 when the face area detected within the limit time is not in a state suitable for the face recognition.

Subsequently, in Step S7, the extracting unit 16 extracts the feature required for the face recognition of the user 10 from the face area of the face image. In other words, the extracting unit 16 detects a plurality of face feature points from the face image. A method of detecting the face feature points as described below is used. The extracting unit 16 uses six points in total of face feature points including two feature points each for eyes, nostrils, and mouth corners as the face feature points.

First of all, the extracting unit 16 detects the image feature point from the face image by using a separability filter. The image feature point may be, for example, corner detection.

Subsequently, the extracting unit 16 performs a pattern matching process on the detected respective image feature points. Specifically, the extracting unit 16 acquires a local image from the face image in the vicinities of the respective image feature points.

Subsequently, the extracting unit 16 calculates a similarity to dictionary information prepared in advance from the image around the eyes, the nostrils, and the mouth corners. A subspace method is used for the calculation of the similarity.

Subsequently, the extracting unit 16 leaves similarities exceeding a predetermined threshold value among the respective similarities calculated at the respective image feature points as feature point candidates.

Subsequently, the extracting unit 16 selects a combination of left and right eyes, left and right nostrils, and left and right mouth corners that satisfies predetermined positional conditions from among the respective feature point candidates as feature points. The predetermined positional relationship includes the distance or the angle of a segment connecting points at the left and right eyes or the like. The extracting unit 16 may obtain the similarity to information of the dictionary prepared in advance in the same manner as the local image by the image normalized with reference to the two points such as the left and right eyes, and set the fact that the obtained similarity exceeds the predetermined threshold value as a condition.

Subsequently, the extracting unit 16 corrects the face orientation to the front by the correspondence between two-dimensional coordinates, of the selected feature points and three-dimensional standard face shape models, and normalizes the vector in which normalized image luminance values are arranged into "1" to obtain the amount of feature. However, the feature is not limited thereto, and the vector obtained by applying Sobel filter or Gabor filter on the image normalized to the front and arranging the luminance values of the image may be employed as the feature. The above-described vector applied with linear conversion such as whitening conversion may be employed as the feature.

Subsequently, in Step S8, the recognizing unit 20 calculates the similarity between the detected feature described above, and the registered feature stored in the storage unit 18 as in the same method. Simple similarity between the features is used as calculation of the similarity, for example.

The recognizing unit 20 determines whether the user 10 is a person who is allowed to pass by, for example, whether or not the similarity exceeds a predetermine threshold value, and if the similarity exceeds the threshold value, determines that the user 10 is the person who is allowed to pass to release the key lock of the door 5 or to illuminate or blinks the key 3 of "OK". Then, the traffic control apparatus 1 terminates the traffic control.

According to Embodiment 1, a method of movement to the state suitable for the face recognition may be instructed to the user 10 by using the light-emitting pattern of the plurality of keys 3 arranged in a lattice pattern even though the display is not provided, and the traffic control apparatus 1 having a high rate of acceptance may be realized.

Embodiment 2

Figure 9:
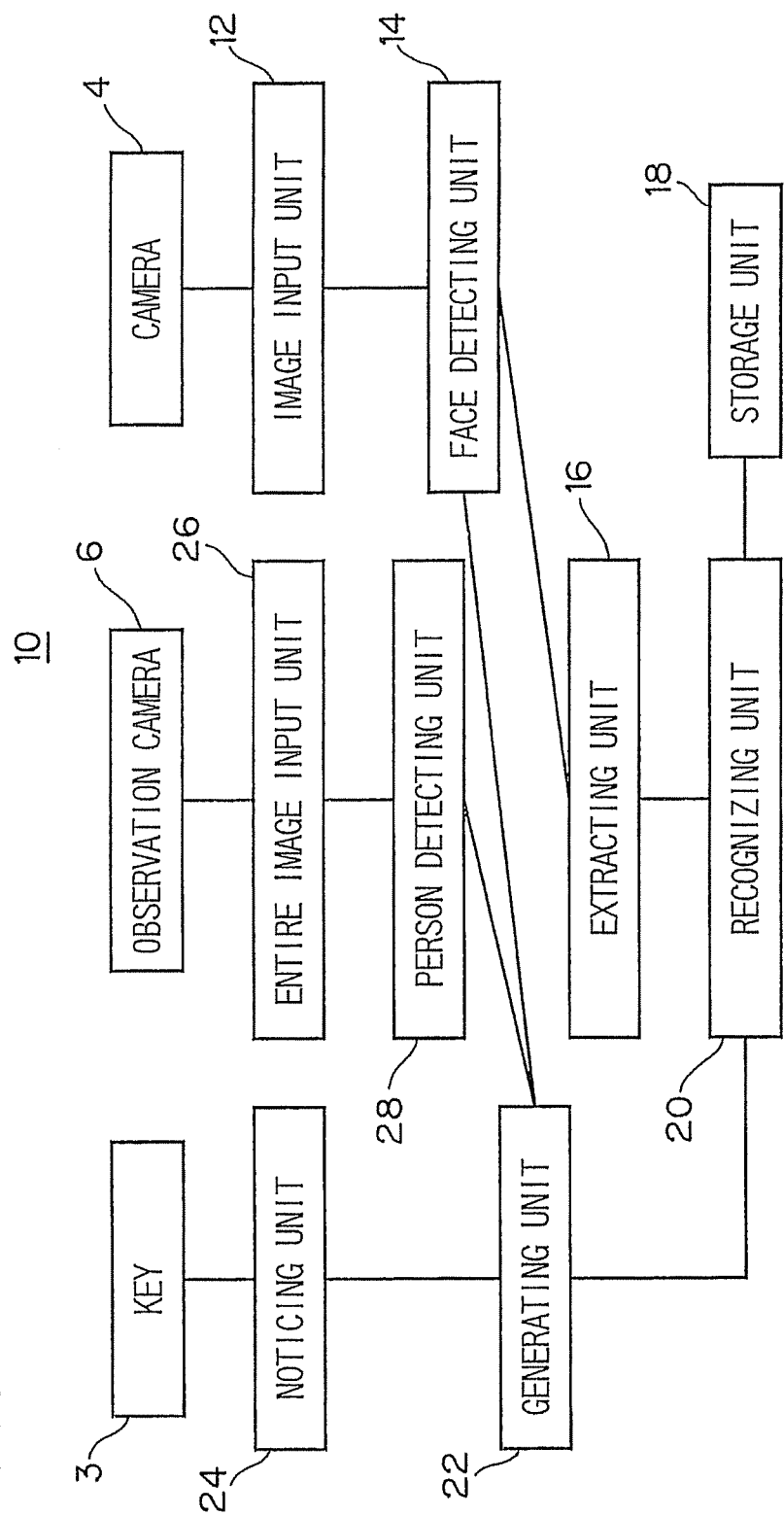
FIG. 9 is a block diagram of the traffic control apparatus according to Embodiment 2.
Figure 10:
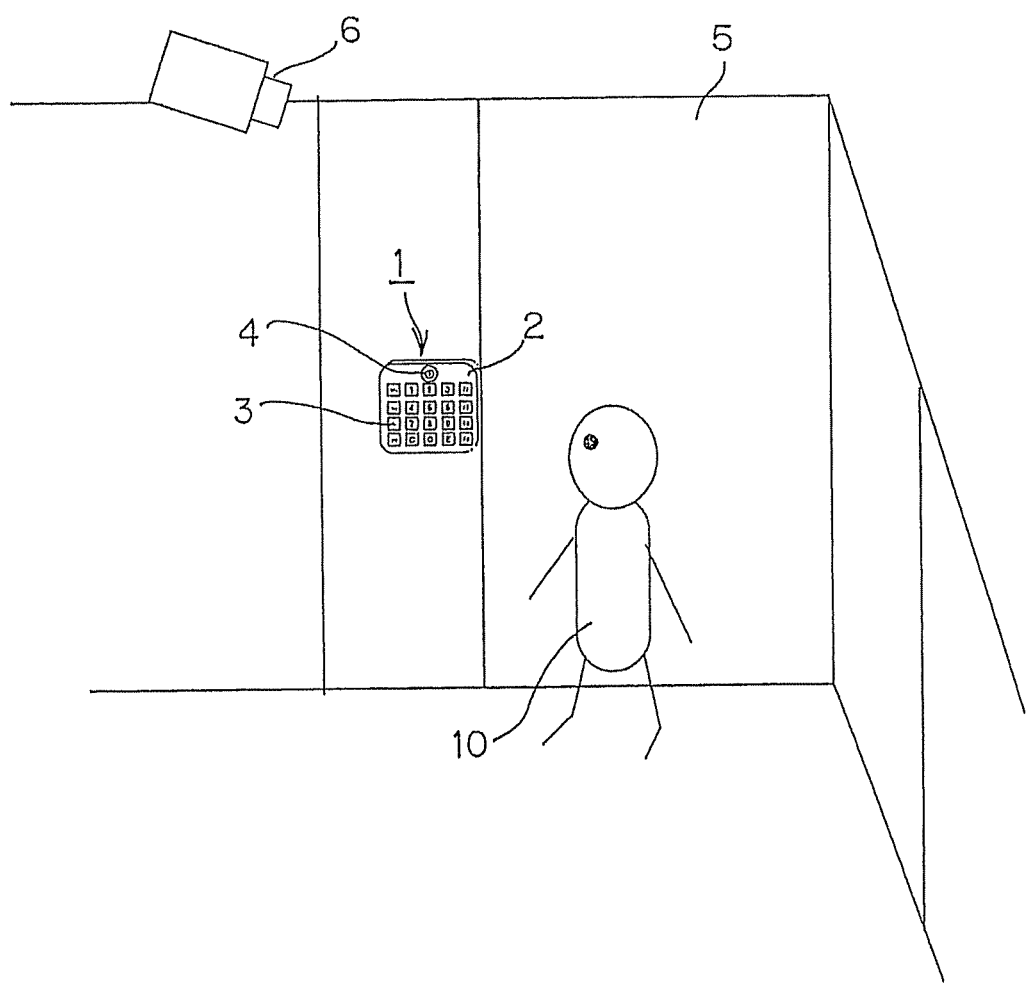
FIG. 10 is a drawing illustrating the state of installation of the traffic control apparatus.

Referring now to FIG. 9 to FIG. 10, the traffic control apparatus 1 according to Embodiment 2 will be described below.

Referring now to FIG. 9 to FIG. 10, the traffic control apparatus 1 according to Embodiment 2 will be described. FIG. 9 is a block diagram illustrating the traffic control apparatus 1 of Embodiment 2, and FIG. 10 is a drawing illustrating the state of installation of the traffic control apparatus 1.

As illustrated in FIG. 9, the traffic control apparatus 1 of Embodiment 2 includes an entire image input unit 26 and a person detecting unit 28 in addition to the image input unit 12, the face detecting unit 14, the extracting unit 16, the storage unit 18, the recognizing unit 20, the generating unit 22, and the noticing unit 24 of the traffic control apparatus 1 of Embodiment 1.

The entire image input unit 26 receives an input of the entire image including an entire body of the user 10 therein from a monitoring camera 6 installed at a position different from the apparatus body 2 of the traffic control apparatus 1 (for example, at a ceiling of a corridor where the door 5 exists), as illustrated in FIG. 10.

The person detecting unit 28 detects an entire area of the user 10 instead of the face or a partial area such as an upper body area of the user 10 from the entire image input by the entire image input unit 26. The face detecting method performed by the face detecting unit 14 described in Embodiment 1 is used as a method of detecting the entire area or the partial area of the user 10. Specifically, the person detecting unit 28 detects by using the entire area or the partial area of the user 10 instead of the face area by learning in advance.

The generating unit 22 determines whether or not the state of the face area (the position and the size) of the user 10 detected by the face detecting unit 14 is suitable for the face recognition from the entire area or the partial area of the user 10 detected by the person detecting unit 28 and generates presentation information from the content of determination. The generating method is as follows.

First of all, the generating unit 22 acquires the positions and the sizes of the entire area or the partial area of the user 10 at a moment when the state of the face area appearing in the face image input to the image input unit 12 is suitable for the face recognition, and a moment when it is not suitable in advance as comparison information in advance.

Secondly, the generating unit 22 stores information indicating how the user 10 should move to achieve the suitable state (for example, move rightward) from the difference between the position or the size in the suitable state and the position or the size not in the suitable state in a instruction table in advance.

The first and second processes are registration process that the generating unit 22 prepares in advance before performing the face recognition of the user 10. From a third process onward, a process of performing the face recognition of the user 10 when entering or going out from the room.

Thirdly, the generating unit 22 inputs the entire area or the partial area of the body of the user 10 detected by the person detecting unit 28.

Fourthly, the generating unit 22 compares the input entire area or partial area with the comparison information, and, if the state of the face area in the face image input to the image input unit 12 is determined to be in the state suitable for the face recognition, gives an instruction to the recognizing unit 20 to perform the face recognition. In contrast, if the generating unit 22 determines that it is the state not suitable, the generating unit 22 generates the presentation information (light-emitting pattern) on the basis of the instruction table corresponding to the comparison information and outputs to the noticing unit 24. The noticing unit 24 presents the user 10 by using the light-emitting pattern of the plurality of keys 3 arranged in the lattice pattern as in Embodiment 1.

According to Embodiment 2, even when the face cannot be detected like a case where the face of the user 10 is not in the image in the image input unit 12, the instruction may be given to the user 10 to move the face to the state suitable for the face recognition, so that the traffic control apparatus 1 having a high rate of acceptance may be realized.

Modifications

As the presentation information of Embodiment 1, the light-emitting elements of the keys 3 are illuminated or blinked to indicate the position or the size of the face area and instruct the user to move the face. However, the invention is not limited thereto.

For example, the light-emitting elements of the keys 3 may be changed in color or may be extinguished to indicate the position or the size of the face area and instruct the user to move the face.

Figure 11:
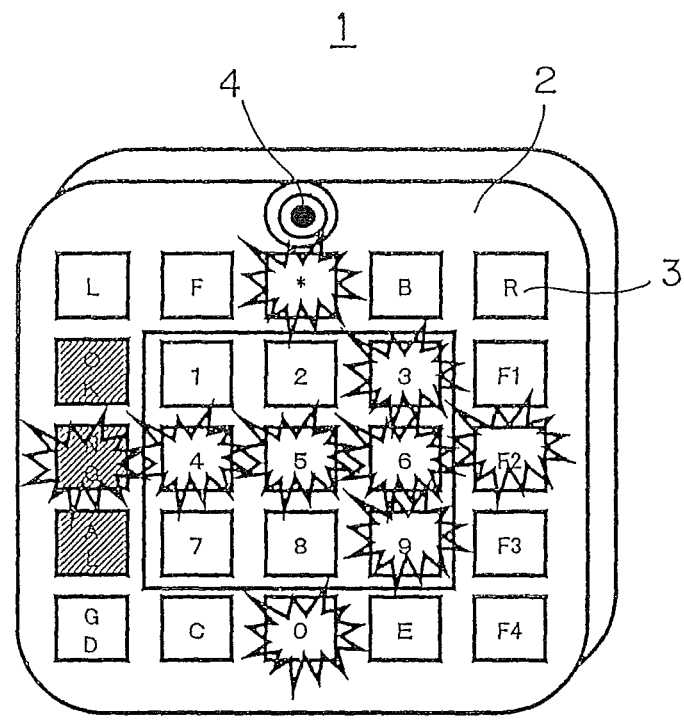
FIG. 11 is a drawing of a light-emitting pattern of keys on the noticing unit according to a first modification.

As illustrated in FIG. 11, the presentation information may be presented by illuminating or blinking the light-emitting elements of the keys 3 arranged in the lattice pattern in an arrow shape by using all the light-emitting elements.

Figure 12:
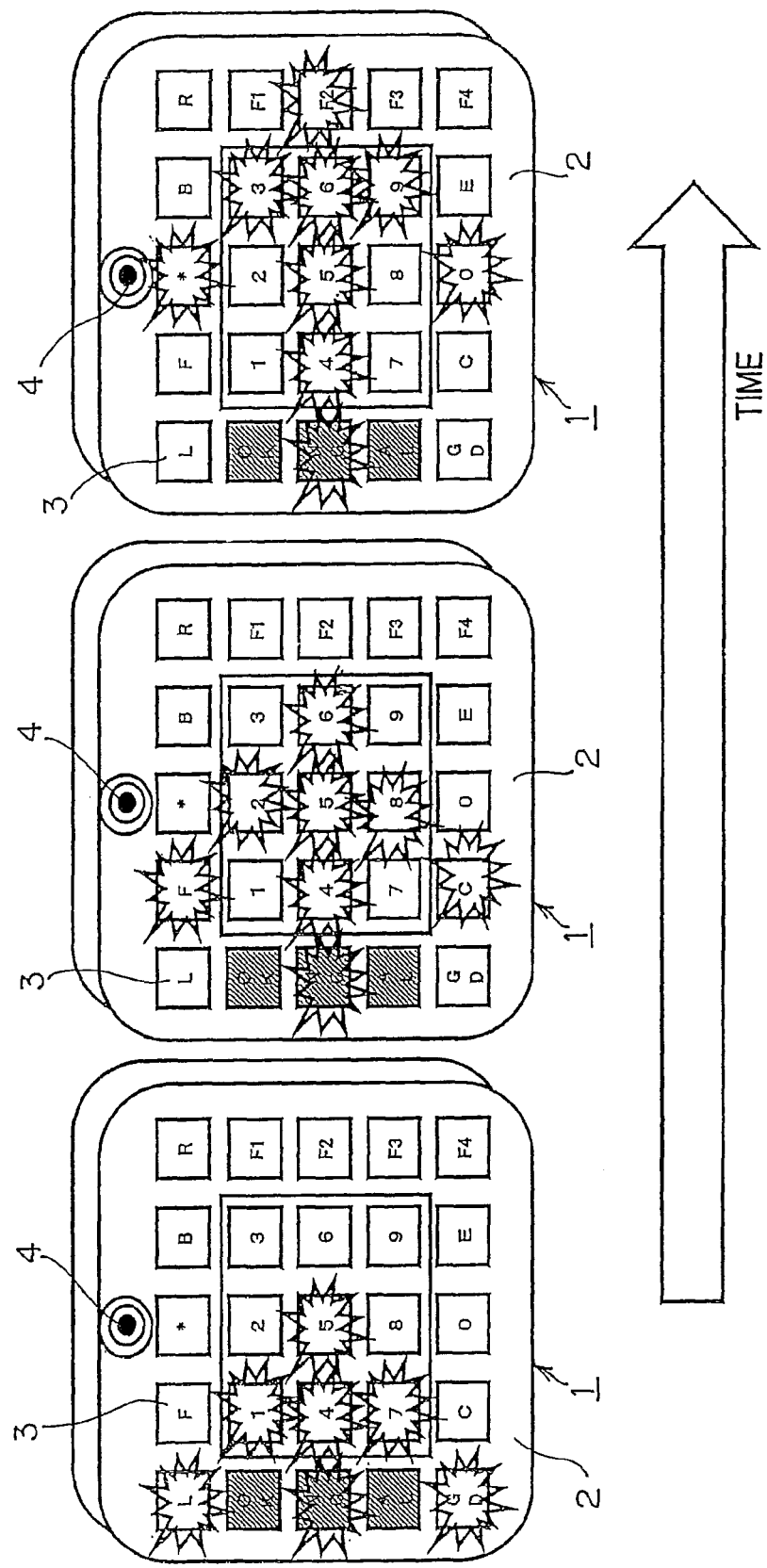
FIG. 12 is a drawing of a light-emitting pattern of keys on the noticing unit according to a second modification.

Also, as illustrated in FIG. 12, the presentation information may be expressed by a dynamic lamp action which moves the light-emitting pattern having an arrow shape of the light-emitting elements of a plurality of keys 3 arranged in the lattice pattern from the left to the right.

Also, as illustrated in FIG. 13, a presenting light-emitting portion 8 may be provided on the apparatus body 2. As the presenting light-emitting portion 8, elongated light-emitting elements are provided at four sides of the keys 3 arranged in the lattice pattern, respectively, and, for example, since the face area detected from the face image is positioned on the left side with respect to the optimal face area as illustrated in FIG. 13B, when the rightward movement is required, the presenting light-emitting portion 8 on the right side is illuminated as the presentation information as illustrated in FIG. 13A. In order to present the position or the size of the current face area, a noticing unit different from the presenting light-emitting portion 8 may be provided. For example, as illustrated in FIG. 3, a line 7 surrounding the ten-key from "1" to "9" may be displayed so as to match the current position or the size of the face. It is also possible to indicate the current position and the size of the face in different colors.

In Embodiment 2, the entire image input unit 26 is used for detecting the entire area or the partial area of the user 10. However, the entire area or the partial area of the user 10 may be detected only by the image input unit 12. The face area of the user 10 may be detected instead of the entire area by using the image from the entire image input unit 26.

Also, the partial face area may be detected instead of the entire area or the face area of the user 10. As a detecting method of the partial face area, detection is performed by using partial face areas such as a right side, a left side, an upper half, and a lower half of the face learned in advance by using the face detecting unit 14 of Embodiment 1.

Figure 14B:
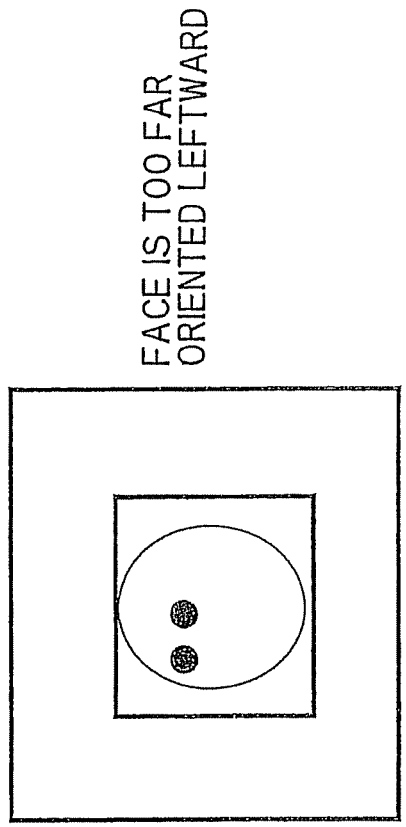
FIG. 14B is a drawing illustrating a face image.
Figure 14A:
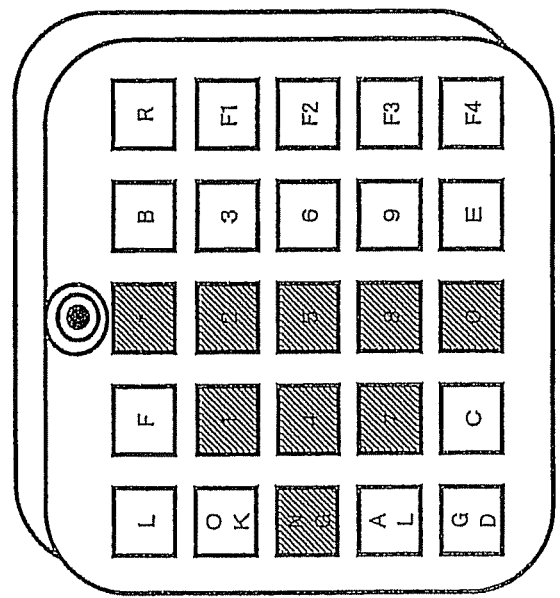
FIG. 14A is a drawing illustrating a light-emitting pattern of keys on the noticing unit according to a fourth modification.
Figure 15:
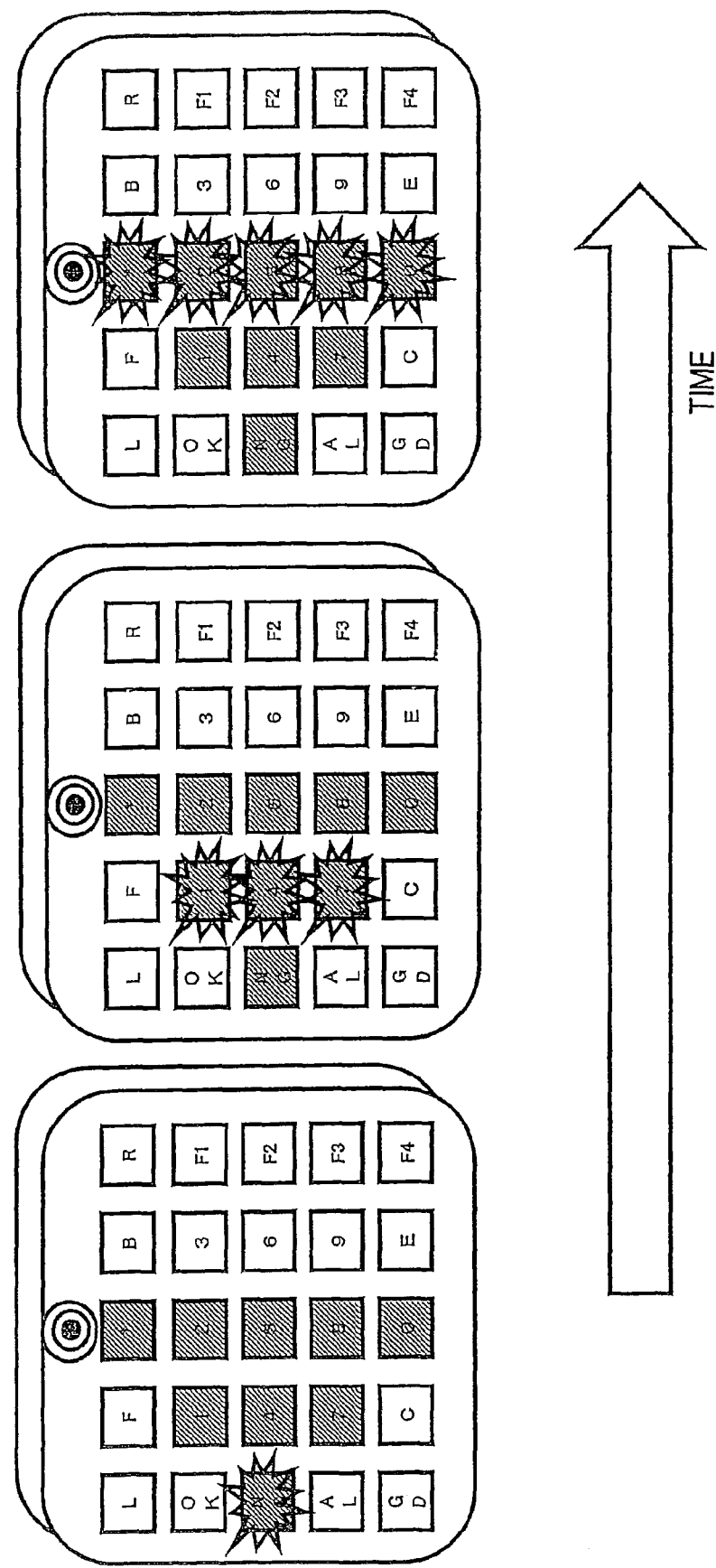
FIG. 15 is a drawing illustrating a light-emitting pattern of the keys on the noticing unit according to the fourth modification.

Also, a change of the state of the face orientation may be instructed instead of, or in addition to the position or the size of the face area in Embodiment 1. In this case, when the face is oriented leftward as illustrated in FIG. 14B, a state in which the user faces leftward is indicted to the user as illustrated in FIG. 14A. Also, as illustrated in FIG. 15, presentation information which prompts a change of the face orientation from the leftward direction to the direction looking at the front is displayed. The face orientations such as upward, downward, leftward, rightward, and frontward are prepared in advance by orientation as the learning data in advance when detecting the face area, and determination is made depending on the orientation at which the face is detected. It is also possible to detect the face feature points, and then calculate the face orientation on the basis of the coordinate thereof.

In the above-described embodiments, the keys 3 are arranged in the lattice pattern. However, the invention is not limited thereto and other types of arrangement are also applicable as long as the keys or the switches are arranged in the matrix pattern.

While certain embodiments have been described, these embodiments have been presented by way of example only, and are not intended to limit the scope of the inventions. Indeed, the novel embodiments described herein may be embodied in a variety of other forms; furthermore, various omissions, substitutions, and changes in the form of the embodiments described herein may be made without departing from the spirit of the inventions. The accompanying claims and their equivalents are intended to cover such forms or modifications as would fall within the scope and spirit of the inventions.

What is claimed is:

1. A traffic control apparatus comprising:
a processor that performs operations, comprising:
inputting an image including a face of a user taken by a camera;
detecting a detected face area of the user from the image;
determining a difference between a first state of the detected face area and a second state of a suitable face area suitable for face recognition;
generating presentation information for instructing the user to move the face to a position and an orientation suitable for the face recognition when the difference is larger than a threshold value; and
using a noticing unit having a plurality of keys to illuminate, blink, or extinguish one or the plurality of keys for specifying the position or the direction that the face is to be moved based on the presentation information.

2. The apparatus according to claim 1, wherein the presentation information is light-emitting patterns of the plurality of keys.

3. The apparatus according to claim 1, wherein the presentation information includes information indicating a current state of the detected face area of the user.

4. The apparatus according to claim 1, wherein the noticing unit includes a light-emitting element in an interior of each of the plurality of keys.

5. The apparatus according to claim 1, wherein the first state of the detected face area is a predetermined position or a predetermined size of the detected face area in the image.

6. The apparatus according to claim 1, wherein the operations further comprise detecting a partial face area of the user from the image; and generating the presentation information based on the partial face area.

7. The apparatus according to claim 1, wherein the image is a first image, and the operations further comprise detecting an entire area or a partial area of a body from a second image in which the body of the user appears; and generating the presentation information based on the entire area or the partial area.

8. The apparatus according to claim 7, wherein the operations further comprise outputting the second image.

9. The apparatus according to claim 1, wherein the operations further comprise extracting an extracted amount of characteristic of the face of the user from the image;

storing an amount of characteristic of a face of a person allowed to pass through as a registered amount of characteristic in advance; and performing the face recognition of the user by collating the extracted amount of characteristic and the registered amount of characteristic.

10. A method controlling traffic comprising:
inputting an image including a face of a user taken by a camera;
detecting a face area of the user from the image;
obtaining a difference between a state of the detected face area and a state of a face area suitable for face recognition, and generating presentation information for instructing the user to move the face to a position and an orientation suitable for the face recognition when the difference is larger than a threshold value; and
illuminating, blinking, or extinguishing one or a plurality of keys for specifying the position or the direction that the face is to be moved on the basis of the presentation information for a noticing unit having the plurality of keys.

11. A program stored in a non-transitory computer readable medium, causing a computer to perform operations comprising:
an image input function configured to input an image including a face of a user taken by a camera;
a face detecting function configured to detect a face area of the user from the image;
a generating function configured to obtain a difference between a state of the detected face area and a state of a face area suitable for face recognition, and generate presentation information for instructing the user to move the face to a position and an orientation suitable for the face recognition when the difference is larger than a threshold value; and
a presentation function configured to illuminate, blink, or extinguish one or a plurality of keys for determining the position or the direction that the face moves on the basis of the presentation information for a noticing unit having the plurality of keys.

* * * * *